Feb. 4, 1958 J. B. TREVOR, JR 2,822,538

PULSE POWER CONTROL

Filed Nov. 5, 1945 4 Sheets-Sheet 1

Inventor

JOHN B. TREVOR, JR.

By Ralph L. Chappell

Attorney

Feb. 4, 1958 J. B. TREVOR, JR 2,822,538

PULSE POWER CONTROL

Filed Nov. 5, 1945 4 Sheets-Sheet 2

Inventor

JOHN B. TREVOR JR.

By Ralph L. Chappell

Attorney

Inventor
JOHN B. TREVOR, JR.
By Ralph L. Chappell
Attorney

Inventor
JOHN B. TREVOR, JR.
By Ralph L. Chappell
Attorney

United States Patent Office 2,822,538

Patented Feb. 4, 1958

2,822,538

PULSE POWER CONTROL

John B. Trevor, Jr., New York, N. Y.

Application November 5, 1945, Serial No. 626,868

4 Claims. (Cl. 343—17.1)

(Granted under Title 35, U. S. Code (1952), sec. 266)

This invention relates to transmission networks operating in connection with amplitude modulated pulses, and is particularly directed to the problem of controlling the signal level in such networks.

In this class of networks the intelligence signal is carried by a series of recurrent impulses as amplitude modulation. The modulating signal power level may be controlled through variation in the impulse amplitude. Since, however, the average power carried by a conventional pulse transmission system is exceedingly low with respect to the voltage amplitude, the power level in the receiver system may be amplified through increasing the impulse duration before the signal is employed in the receiver output circuit.

The invention provides for the control of the signal level by variation in the time duration of the lengthened pulse.

It is accordingly an object of the invention to control the power level of a pulse signal through effecting variation in the pulse duration.

It is another object of the invention to control the modulation power component of an amplitude modulated pulse signal through variation in the impulse duration periods.

It is another object of the invention to provide an automatic gain control system for a pulse transmission network.

It is another object of the invention to provide an automatic gain control for an amplitude modulated pulse transmission network.

The invention will be further described with reference to the exemplary embodiments disclosed in the drawings in which:

Fig. 1 discloses in block diagram a pulse transmission network embodying the instant invention;

Figure 1:
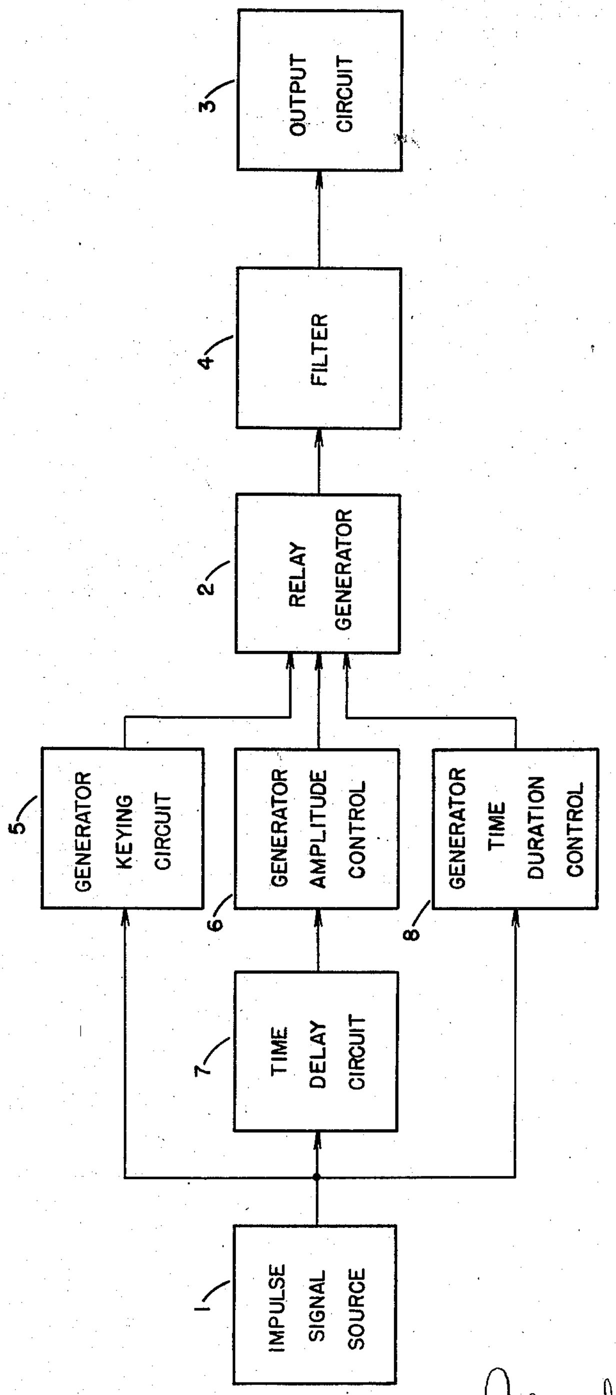

The pulse transmission network shown in Fig. 1 is fed from an input pulse signal source 1. Its output signal is supplied from a relay generator 2. The latter drives an output circuit 3 through a rejection filter 4 for removing the pulse repetition frequency.

Relay generator 2 operates under control of an injected keying signal to supply an output pulse having an amplitude and a time duration which may be separately controlled. The generator keying voltage is supplied from keying circuit 5 and is derived from the pulse signal. The amplitude of the generator output pulse is determined by control circuit 6, which also operates in dependency on the pulse signal amplitude fed thereto through a time delay circuit 7. The latter circuit functions to delay the amplitude control signal slightly with respect to the keying signal which conditions the relay generator for operation, and is used in connection with the specific relay generator to be discussed in connection with the disclosure of Fig. 2.

The time duration of the relay generator output pulse is determined by circuit 8 which supplies the requisite control voltage. In the circuit of Fig. 1, an amplitude modulated recurrent pulse signal may be supplied from source 1. In many transmission networks, such as that shown in this figure, it is desirable to stabilize the output signal power level. This is accomplished by operating the generator time duration control circuit 8 in dependency on the input signal characteristics. Accordingly, control circuit 8 functions in accordance with the average power of the pulse modulation envelope to vary the time duration of the relay generator output pulse, and thereby effects stabilization of the output signal power.

Figure 2:
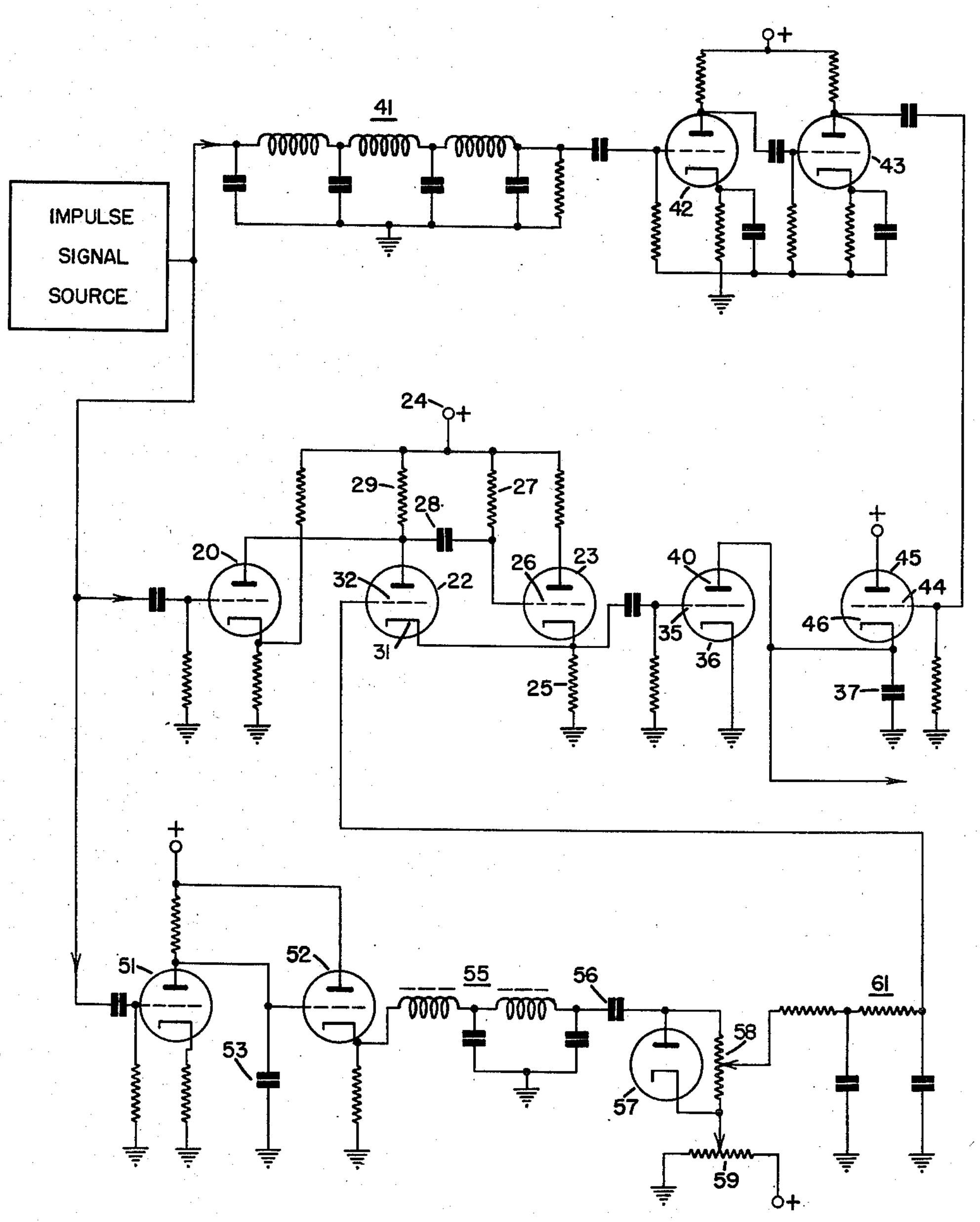
Fig. 2 shows in circuit diagram certain components of Fig. 1.

Fig. 2 shows in circuit diagram exemplary components for use as the relay generator and its control circuits in a system such as shown in Fig. 1. In this specific embodiment, the impulse signal source 1 may supply recurrent pulse signals appearing at a repetition rate such as 20,000 cycles per second, and having a pulse duration time of a few micro-seconds. These pulses serve as a carrier under amplitude modulation, which in the suggested example, may comprise audio frequencies for speech transmission. The signal output from source 1 comprises, therefore, unidirectional pulses of very low average power. The output signal of Fig. 2 also comprises unidirectional pulses appearing at the same repetition rate as the input signal, but of much greater duration and, therefore, of increased power. The circuit functions, as described in connection with Fig. 1, to stabilize the power of the output signal through effecting compensating variations in the time duration of the output pulses.

It is assumed that the output signal from source 1 comprises positive pulses. These pulses are fed directly to the generator keying circuit which comprises tube 20. The response of the keying circuit is uniform, and is not affected by the pulse amplitude of the keying voltage.

Keying tube 20 initiates operation of the relay generator circuit comprising tubes 22 and 23. The latter are energized from a positive potential supply 24, and are returned to ground through a common cathode resistor 25. Tube 23 is normally conducting through the return of control grid 26 to the positive potential supply through resistor 27. Both cathodes are therefore at a relatively high positive potential, and tube 22 is nonconducting in a relaxed condition.

Keying tube 20 is connected to control grid 26 of tube 23 through coupling capacity 28. Tubes 20 and 22 are provided with a common anode resistor 29. The keying signals applied to tube 20 produce a sharp negative output pulse which blocks tube 23 under action of its control grid 26. The cathodes of tubes 22 and 23 immediately lose voltage until cathode 31 of tube 22 begins to fall into the conducting region for this tube under its applied grid potential. At this point, the decrease in the cathode potential reaches an equilibrium with conduction in tube 22 to stabilize its anode potential at an intermediate value. This intermediate value lies below its previous relaxed condition potential by an amount varying with the positive potential on control grid 32 of tube 22. The resulting drop in anode potential of tube 22 is applied through capacity 28 to control grid 26 of tube 23, and consequently, the latter tube is maintained blocked for a time period following termination of the keying signal from tube 20. This time is determined by the discharge time constant of condenser 28 and resistors 27 and 29. The time required for tube 23 to regain conduction will increase under an increasingly positive control voltage applied to grid 32 of tube 22.

A control voltage is taken from across the common cathode resistor 25 and is applied to grid 35 of tube 36.

The latter tube is accordingly rendered non-conducting during the blocked period of tube 23, which in turn is under control of the potential applied to grid 32 of tube 22. Anode 40 of tube 36 is connected to capacity 37 which is returned to ground. Consequently, the latter condenser may be charged positive only during the blocked period of tube 36.

The output signal is developed across condenser 37 having a time duration determined through the network just described, and having an amplitude determined by the amplitude of the input pulse signal.

The amplitude control signal is derived from the input signal which is delivered through a time delay circuit. The latter may conveniently be a short artificial line section, as is shown at 41 in Fig. 2. A delay time of 5 microseconds was found to be entirely satisfactory in connection with relay pulse generator just described. The delayed output of line 41 is amplified in tubes 42 and 43 and is applied as a positive uni-polar impulse voltage to control grid 44 of tube 45. The latter is connected as a cathode follower, its cathode 46 being connected with condenser 37.

Thus, by the operation of the components so far described, condenser 37 is charged to a value proportional to the amplitude of the input pulse signal, the charge being maintained during the blocked period of tube 36, and then being discharged after a timing interval which is determined by the positive potential applied at control grid 32 of relay generator tube 22. It will be understood, naturally, that the timing interval will not exceed the time between input pulses.

The voltage signal developed across condenser 37 may be passed through any convenient type of filter to remove the pulse repetition frequency component, and delivered directly to an output circuit such as a speaker circuit. Manifestly, the output power will be under control of potential applied to control grid 32 of tube 22, through which the output pulse duration is determined. The circuit of Fig. 2 further includes components which employ this control to stabilize the output power. For this purpose, the pulse signal, preferably lengthened to increase its power, is applied through filter 55 to a demodulating and smoothing circuit to develop an automatic gain control voltage. Such a pulse signal is available at condenser 37, but in the circuit of Fig. 2 is developed across loading condenser 53 in the anode circuit of tube 51 fed from the input signal source. The output of cathode follower tube 52, fed from tube 51, is filtered at 55 to remove the pulse repetition frequency, and is coupled through capacitor 56 to a rectifying circuit including diode 57 and load impedance 58 supplying a negative output. This detector circuit is returned to adjustable potentiometer 59 connected between a positive potential source and ground. The detector circuit output is direct coupled to control grid 32 of tube 22 through a further low-pass filter 61.

Through the operation of these components, the quiescent bias applied to control grid 32 will be determined by potentiometer voltage divider 59. Under high percentage pulse amplitude modulation, this quiescent bias will be proportionately reduced in accordance with the average modulation envelope amplitude. This more negative voltage is applied to control grid 32, and accordingly reduces the conduction level in that tube subsequent to injection of the keying signal from tube 20. This in turn reduces the voltage differential across anode load resistor 29, and thereby shortens the recovery time of conduction of tube 23 under control of its grid 26. It will therefore be seen that the transmission network of Fig. 2 has a high dynamic range, and will supply stable output power through the controlled diminution of the output impulse duration with increase in impulse amplitude modulation.

Figure 3:
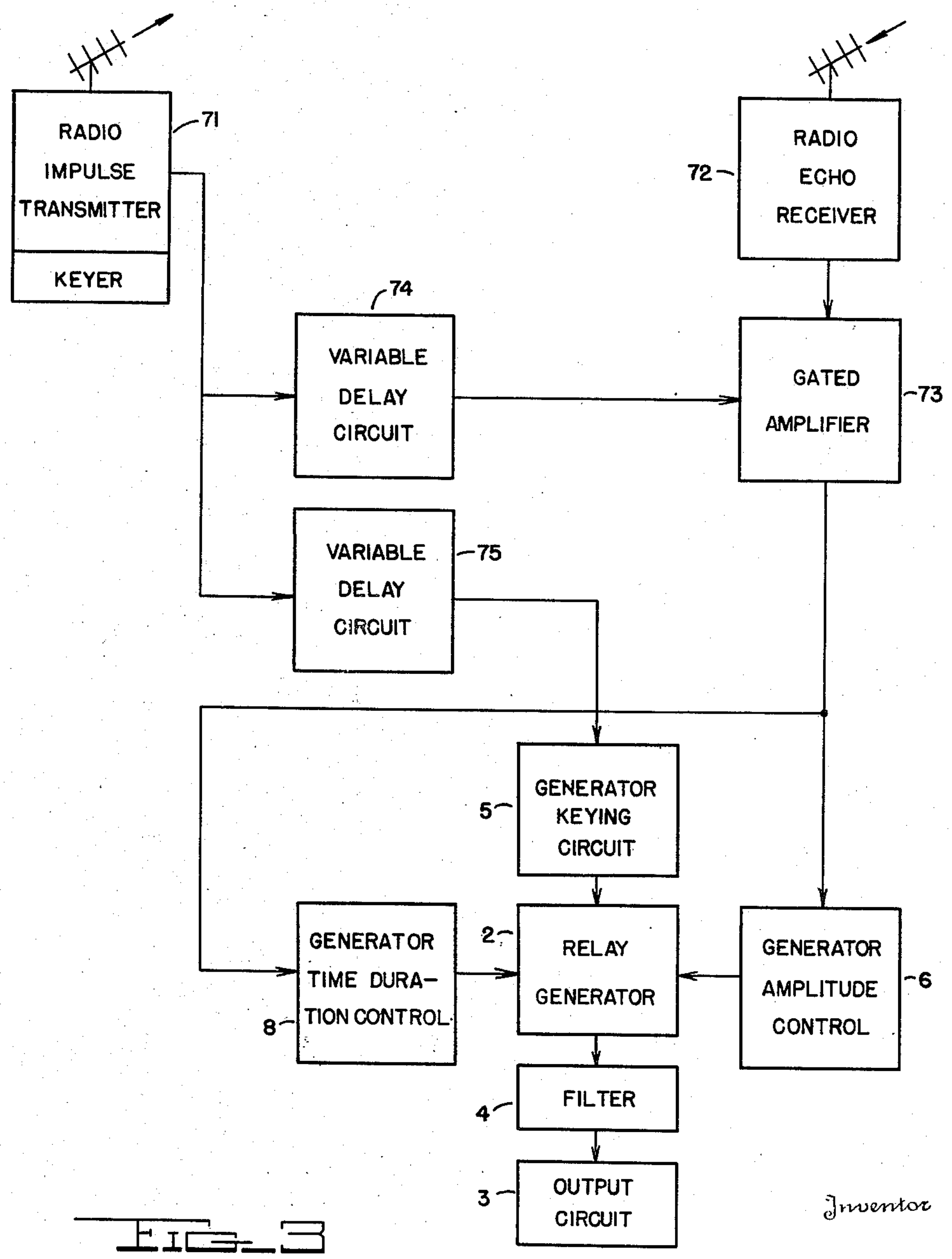
Fig. 3 shows in block diagram a radio echo ranging system employing the invention.

Application of the invention to a radio-echo ranging system is shown in Fig. 3. Such systems comprise a radio pulse transmitter 71 effecting directional transmission of recurrent radio frequency wave trains. Upon encountering an obstacle a portion of the radiated energy is reflected and may be received by a radio echo receiver 72. Under certain circumstances, the reflected signal will carry definite amplitude modulation. This may occur, for instance, where the reflecting obstacle comprises a rapidly rotating object.

Thus, the radio echo receiver will supply a recurrent series of amplitude modulated echo pulses. For any specific obstacle, such echo will appear with definite phase lag with regard to the repetition frequency established by the radio impulse transmitter under operation of its keying circuit, depending on the propagation time during transmission and reflection. In order to segregate the echo signal from the obstacle under examination from other obstacle echoes appearing in different phase retardation with respect to the radio impulse transmitter operation, a gated amplifier channel 73 is provided. This amplifier channel is normally inoperative, and is thrown into operative condition at the desired phase position through a variable delay circuit 74. The latter supplies an output impulse for operating the amplifier during the desired echo reception and is controllable with respect to the delay period which begins responsively to signals supplied from the radio impulse transmitter keyer.

Under the desired conditions, therefore, the output of the gated amplifier channels 73 comprises a series of recurrent impulse signals under amplitude modulation. This signal is identical with the signal supplied by pulse signal source 1 as shown in Figs. 1 and 2.

Instead, however, of employing a fixed time delay circuit such as is shown at 41 in Fig. 2, it may be preferable to use a separate variable delay network for supplying keying voltage to the relay generator keying circuit. Such a network is shown at 75 in Fig. 3 and is operative to establish a selected timing peroid beginning at each operation of the radio impulse transmitter.

In certain specific constructions of radio pulse echo ranging systems, components 73, 74, and 75 may be present in the indicator system which is operated by radio echo receiver 72.

The relay generator 2, its output circuit 3 and rejection filter 4, and also the keying circuit 5, generator amplitude control 6, and generator time duration control 8 may in all respects be identical with those components as described in the system of Figs. 1 and 2. The additional components constituting the gated amplifier together with its variable time delay circuit, and the second variable time delay circuit 75 for operating keying circuit 5, are shown in schematic detail in Fig. 4.

Figure 4:
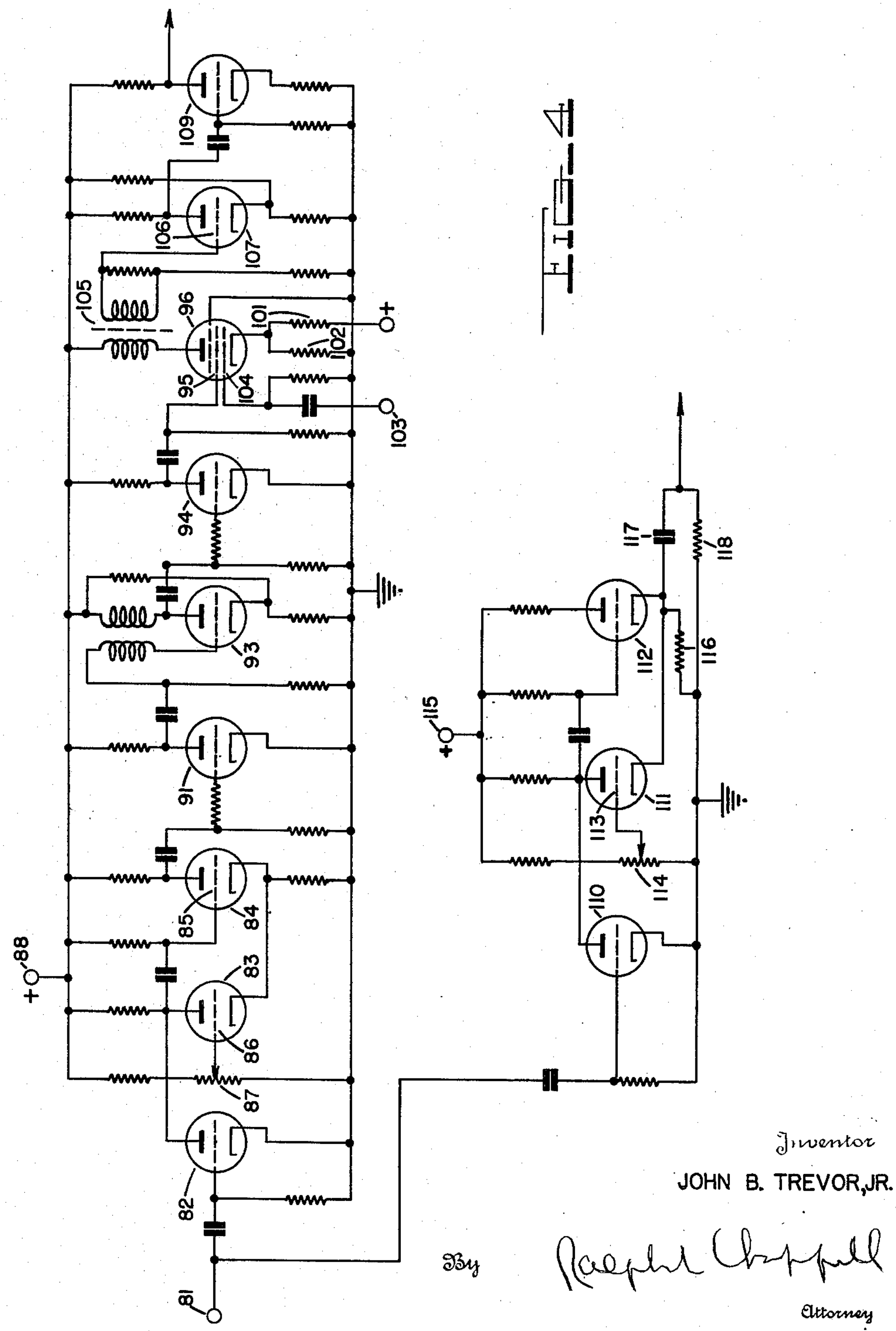
Fig. 4 discloses in circuit diagram certain components of Fig. 3.

The control signal for the circuit of Fig. 4 is introduced to terminal 81. This signal may be produced coincidentally with operation of the radio impulse transmitter and may specifically comprise a positive impulse applied to the transmitter grid return circuit. The positive impulse is inverted in amplifier tube 82. Tubes 83 and 84 operate to supply a positive output impulse of controlled duration from the time of the injection signal. These tubes are connected in a circuit identical with that of tubes 22 and 23 of Fig. 2. It will thus be understood that tube 84 is normally conducting, that this tube is blocked on reception of the negative keying signal, and that tube 83 then goes into conduction. The anode drop effected by conduction of tube 83 holds the control grid 85 of tube 84 below a conducting value until the latter recovers. As in the circuit of Fig. 2, the recovery time is determined by the potential applied to control grid 86 of tube 83. In the circuit of Fig. 4, control grid 86 is returned to voltage divider 87 which is connected between ground and the positive potential source 88. Accordingly, variation of the tap position on this voltage divider controls the recovery time of tube 84, and thereby established the time delay period.

The output signal from the network comprising tubes 83 and 84 is derived from the anode of tube 84. This is differentiated in the input circuit to tube 91 and is also inverted through this tube. Consequently, tube 91 supplies a short positive output impulse having a phase delay with respect to operation of the radio impulse transmitter which may be determined by the setting of voltage divider 87. This positive potential impulse is employed to key a self-blocking oscillator comprising tube 93. This oscillator in its output circuit supplies a single negative impulse which in turn drives tube 94 to cutoff and supplies in its output circuit a flat topped gating signal. The latter is applied to grid 95 of the gated amplifier channel tube 96.

Tube 96 is normally biased to cutoff through the positive potential maintained on its cathode through the voltage divider action of resistors 101 and 102 connected between a positive potential supply and ground. The radio echo receiver output signal is introduced at terminal 103 for application to control grid 104 of tube 96. The time duration of the clipped gating signal is sufficient to pass the desired radio echo impulse, and accordingly, the latter appears in the anode load circuit of tube 96. The output signal from the anode circuit of tube 96 is coupled through transformer 105 to grid 106 of a normally blocked tube 107. The signal applied to grid 106 comprises a positive impulse furnished by the gating signal carrying super-imposed thereon as a further positive excursion the desired radio echo impulse. Tube 107 is normally biased beyond cut-off by a value sufficient to prevent conduction in this tube except in the presence of the added radio echo signal. Accordingly, only the radio echo impulse itself will be delivered from tube 107. The output of tube 107, comprising a negative impulse, may be inverted in tube 109 for application to the generator amplitude control and the generator time duration control circuits 6 and 8, respectively, as shown in Fig. 3. The latter components may include, if desired, control grid 44 and the control grid of tube 51, as shown in the specific embodiment of Fig. 2.

The variable delay network 75, as shown in Fig. 3, may also be driven from input terminal 81 in Fig. 4. This delay network comprises tubes 110, 111, and 112, connected in a network identical with that of tubes 82, 84, and 85 in the same figure. Control grid 113 of tube 111 is returned to a variable voltage divider 114 connected between a source of positive potential 115 and ground. From the preceding discussion of this type of network, it will be understood that the time delay thereof may be determined through adjustment of voltage divider 114. The output from the variable network is derived from the common cathode resistor 116. This control voltage is differentiated through condenser 117 and resistor 118, and therefore supplies a positive output keying impulse at the end of a pre-selectable timing period. This time delay network will be set for a slightly shorter delay period than that of tubes 83 and 84, so that the relay generator initiating signal will precondition the network for the reception of the generator amplitude control signals. In a specific embodiment of Fig. 3, it will be understood that the output across resistor 118 will supply the positive keying impulse voltage which was applied to the control grid of tube 20 in Fig. 2.

Accordingly, the circuit components shown in Fig. 2 may be operated in conjunction with the radio echo ranging system of Fig. 3 through the operation of the specific circuit components described in connection with Fig. 4.

Through the invention, therefore, as applied to a radio echo ranging system, a specific obstacle may be identified if it effects a recurrent amplitude modulation of the echo signal.

It will be understood that the specific embodiments described are exemplary of the invention, and are not to be taken as limiting the same. The scope of the invention may be ascertained with reference to the appended claims.

The invention described herein may be manufactured and used by or for the Government of the United States of America for governmental purposes without the payment of any royalties thereon or therefor.

What is claimed is:

1. An automatic gain control for an amplitude modulated pulse transmission system comprising an input channel for receiving amplitude modulated signals, potential storage means, means operative responsively to the input channel signal to charge said storage means proportional to an input channel pulse amplitude, relay means operative to discharge said storage means at a variable time after said charging occurs, relay control means responsive to the input channel signal for controlling said variable time after said storage means is charged, said variable time being inversely proportional to the average power of said received pulse, and an output circuit fed by the potential storage means.

2. In combination, a radio pulse transmitter, a radio echo receiver adapted for reception of amplitude modulated pulse signals, potential storage means, means operative responsively to the receiver to charge said storage means proportional to a received pulse amplitude, relay means operative to discharge said storage means at a variable time after said charging occurs, relay control means responsive to the receiver signal for controlling said variable time after said storage means is charged, said variable time being inversely proportional to the average power of said received pulse, and an output channel fed by the potential storage means.

3. In an electrical signal wave shaping circuit, a source of signals, an energy storage device having controllable charge and discharge periods, timing means connected to said energy storage device for controlling said charge and discharge periods in dependency on applied signals, means for applying a signal from said source to said timing means to initiate operation of said timing means, time duration control means connected to said timing means for determining the termination of operation of said timing means in dependency on applied signals, means for applying said signal to said time duration control means, means connected to said energy storage device for storing energy in said energy storage device in dependency upon the amplitude of applied signals, and means for applying said signal to said last mentioned means.

4. In an electrical signal wave shaping circuit, a source of signals, an energy storage device having controllable charge and discharge periods, timing means connected to said energy storage device for controlling said charge and discharge periods in dependency on applied signals, means for applying a signal from said source to said timing means to initiate operation of said timing means, time duration control means connected to said timing means for determining the termination of operation of said timing means in inverse relation to the power of applied signals, means for applying said signal to said time duration control means, means connected to said energy storage device for storing energy in said energy storage device in dependency on the amplitude of applied signals, and means for applying said signal to said last-mentioned means.

References Cited in the file of this patent

UNITED STATES PATENTS

| | | |
|---|---|---|
| 2,265,290 | Knick | Dec. 9, 1941 |
| 2,307,023 | Cooke | Jan. 5, 1943 |
| 2,329,570 | Wellenstein | Sept. 14, 1943 |
| 2,404,527 | Potapenko | July 23, 1946 |
| 2,419,340 | Easton | Aug. 22, 1947 |
| 2,451,632 | Oliver | Oct. 19, 1948 |
| 2,462,859 | Grieg | Mar. 1, 1949 |
| 2,492,018 | Sunstein | Dec. 20, 1949 |
| 2,572,080 | Wallace | Oct. 23, 1951 |

FOREIGN PATENTS

| | | |
|---|---|---|
| 520,606 | Great Britain | Apr. 29, 1940 |